United States Patent
Zeng et al.

(10) Patent No.: US 11,669,057 B2
(45) Date of Patent: Jun. 6, 2023

(54) NEURAL NETWORK THERMAL BEHAVIOR PREDICTIONS

(71) Applicant: Hewlett-Packard Development Company, L.P., Spring, TX (US)

(72) Inventors: Jun Zeng, Palo Alto, CA (US); He Luan, Palo Alto, CA (US)

(73) Assignee: HEWLETT-PACKARD DEVELOPMENT COMPANY, L.P., Spring, TX (US)

( * ) Notice: Subject to any disclaimer, the term of this patent is extended or adjusted under 35 U.S.C. 154(b) by 332 days.

(21) Appl. No.: 16/761,834

(22) PCT Filed: Dec. 13, 2017

(86) PCT No.: PCT/US2017/066047
§ 371 (c)(1),
(2) Date: May 6, 2020

(87) PCT Pub. No.: WO2019/117886
PCT Pub. Date: Jun. 20, 2019

(65) Prior Publication Data
US 2021/0200187 A1 Jul. 1, 2021

(51) Int. Cl.
*G05B 13/02* (2006.01)
*B33Y 10/00* (2015.01)

(52) U.S. Cl.
CPC .......... *G05B 13/027* (2013.01); *B33Y 10/00* (2014.12)

(58) Field of Classification Search
CPC .......... B29C 35/0288; B29C 64/165; B29C 64/295; B29C 64/386; B33Y 10/00; B33Y 50/02; G05B 13/027; G05B 19/4099; G05B 2219/35134; G05B 2219/49023; G06F 2113/10; G06F 2119/08; G06F 30/27; G06N 3/0445; G06N 3/0454; G06N 3/08
See application file for complete search history.

(56) References Cited

U.S. PATENT DOCUMENTS

| | | | |
|---|---|---|---|
| 2014/0156053 A1* | 6/2014 | Mahdavi | H04L 9/3271 |
| | | | 700/119 |
| 2015/0045928 A1 | 2/2015 | Perez et al. | |
| 2017/0087767 A1 | 3/2017 | Grewell | |
| 2017/0217102 A1 | 8/2017 | Mansi et al. | |
| | (Continued) | | |

FOREIGN PATENT DOCUMENTS

| | | |
|---|---|---|
| CN | 101211341 A | 7/2008 |
| CN | 106061713 A | 10/2016 |
| | (Continued) | |

OTHER PUBLICATIONS

3d Printing Software From Design to Manufacture, 2017, https://www.autodesk.com/products/netfabb/features.

(Continued)

*Primary Examiner* — Chun Cao
(74) *Attorney, Agent, or Firm* — Shook, Hardy & Bacon L.L.P.

(57) ABSTRACT

Examples of a thermal behavior prediction method are described herein. In some examples of the thermal behavior prediction method, a predicted heat map of a layer corresponding to a three-dimensional (3D) model is computed using at least one neural network. The predicted heat map is computed based on a contone map corresponding to the 3D model.

13 Claims, 7 Drawing Sheets

(56) References Cited

U.S. PATENT DOCUMENTS

2017/0239719 A1    8/2017   Buller et al.
2018/0111320 A1*   4/2018   Zhao .................. G05B 19/4099
2019/0111626 A1*   4/2019   Hierro Domenech . B33Y 30/00

FOREIGN PATENT DOCUMENTS

| | | |
|---|---|---|
| CN | 106855952 A | 6/2017 |
| CN | 106881462 A | 6/2017 |
| CN | 107431790 A | 12/2017 |
| WO | WO-2012146943 A3 | 11/2012 |
| WO | WO-2015022572 A3 | 2/2015 |
| WO | WO-2016195665 | 12/2016 |
| WO | WO-2017019088 A1 | 2/2017 |
| WO | WO-2017186278 A1 | 11/2017 |

OTHER PUBLICATIONS

Eydivand< M-A., et al., Optimal Design of a 3d-printed Scaffold Using Intelligent Evolutionary Algorithms, Feb. 2016, http://www.sciencedirect.com/science/article/pii/S156849461500722X.

Chokkalingham, S., et al. "Predictinq the depth of penetration and weld bead width from the infra red thermal image of the weld pool using artificial neural network modelling", Journal of Intelligent Manufacturing, Kluwer Academic Publishers, BO, vol. 23, No. 5, Mar. 23, 2011 {Mar. 23, 2011), pp. 1995-2001.

Ding, Donghong, et al. "Bead modelling and implementation of adaptive MAT path in wire and are additive manufacturing", Robotics and Computer Integrated Manufacturing, Elsevier Science Publishers BV., Barking, GB, vol. 39, Dec. 19, 2015 {Dec. 19, 2015), pp. 32-42.

Chowdhury, Sushmit, et al. "Artificial Neural Network Based Geometric Compensation for Thermal Deformation in Additive Manufacturing Processes", vol. 3: Joint MSEC-NAMRC Symposia, Jun. 27, 2016 (Jun. 27, 2016), 11 pages.

* cited by examiner

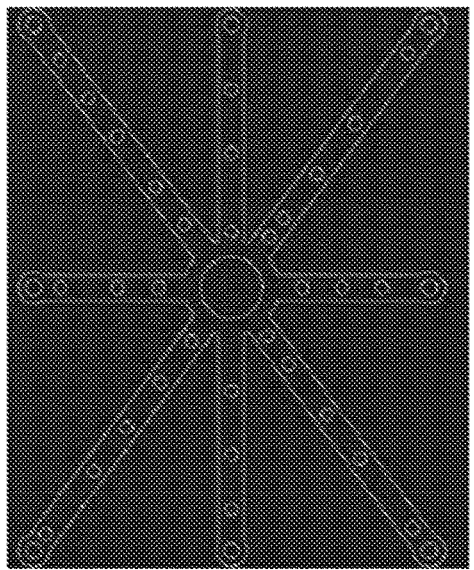
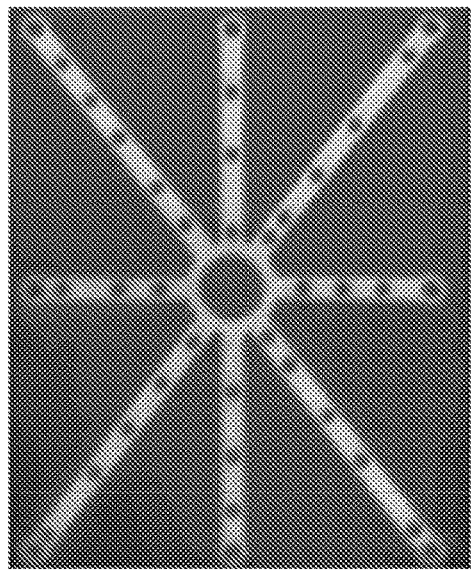
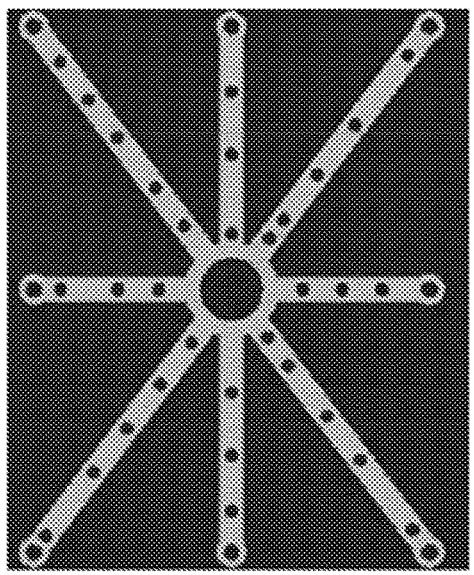
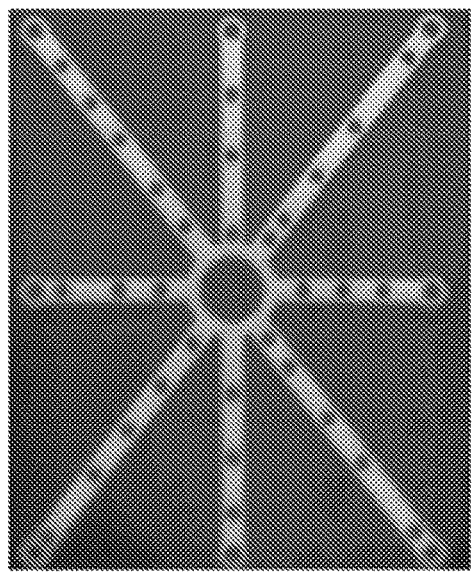
FIG. 7

NEURAL NETWORK THERMAL BEHAVIOR PREDICTIONS

BACKGROUND

In three-dimensional (3D) printing, 3D solid parts may be produced from a digital model using an additive printing process. 3D printing may be used in rapid prototyping, mold generation, mold master generation, and short-run manufacturing. Some 3D-printing techniques are considered additive processes because they involve the application of successive layers of build material. This is unlike traditional machining processes that often remove material to create the final part. In some 3D-printing techniques, the build material may be cured or fused.

BRIEF DESCRIPTION OF THE DRAWINGS

FIG. 7 illustrates examples of a contone fusing map, a contone detailing map, a thermal image, and a predicted heat map.

DETAILED DESCRIPTION

Three-dimensional (3D) printing is an additive manufacturing process that may be used to manufacture 3D objects. Some examples of 3D printing may selectively deposit agents (e.g., droplets) at a pixel level to enable control over voxel-level energy deposition. For instance, thermal energy may be projected over material in a build area, where a phase change and solidification in the material may occur depending on the voxels where the agents are deposited.

Predicting transient thermal behavior with print process resolution (e.g., voxel-by-voxel in space and/or layer-by-layer in time) may be used to improve offline print tuning and/or online printing control. However, it is difficult to derive a quantitative model for predicting transient thermal behavior due to a lack of quantitative knowledge in terms of how material behaves. Some examples of factors in voxel-level thermal physics may include heat flux (e.g., in-layer heat flux from neighboring voxels (anisotropic conductivity), heat flux from a layer below the voxel, heat flux from a layer above the voxel, etc.), fuse energy, non-discriminative flux (convection, radiation), non-discriminative sourcing, melt enthalpy, conduction, absorption, and/or evaporation, etc. It may be difficult to measure voxel-level thermal diffusivity (which may be anisotropic and phase-dependent) and convective thermal loss due to airflow (which may be driven by moving parts). For instance, thermal diffusivity may depend on phase, such as whether material is in a loose powder form, in a melting pool, or other phases in-between. Within the context of thermal physics prediction, the term "voxels" may refer to "thermal voxels." The size of a thermal voxel may be defined as a minimum that is thermally meaningful (e.g., larger than 42 microns or 600 dots per inch (dpi)).

This disclosure describes examples of quantitative models for predicting thermal behavior. In some examples, one or more neural networks may be used to compute predicted thermal behavior (e.g., one or more heat maps). For instance, the neural network(s) may utilize one or more contone maps (e.g., voxel-level machine instructions) and/or one or more thermal images of a build area to predict a heat map. Offline print tuning and/or online printer control may be performed using the heat map in some examples. While plastics may be utilized as a way to illustrate some of the approaches described herein, the thermal behavior (e.g., heat map) prediction described herein may be applied to other variations of fusion technologies where voxel-level thermal control is achieved through energy-modulating agents.

Figure 1:
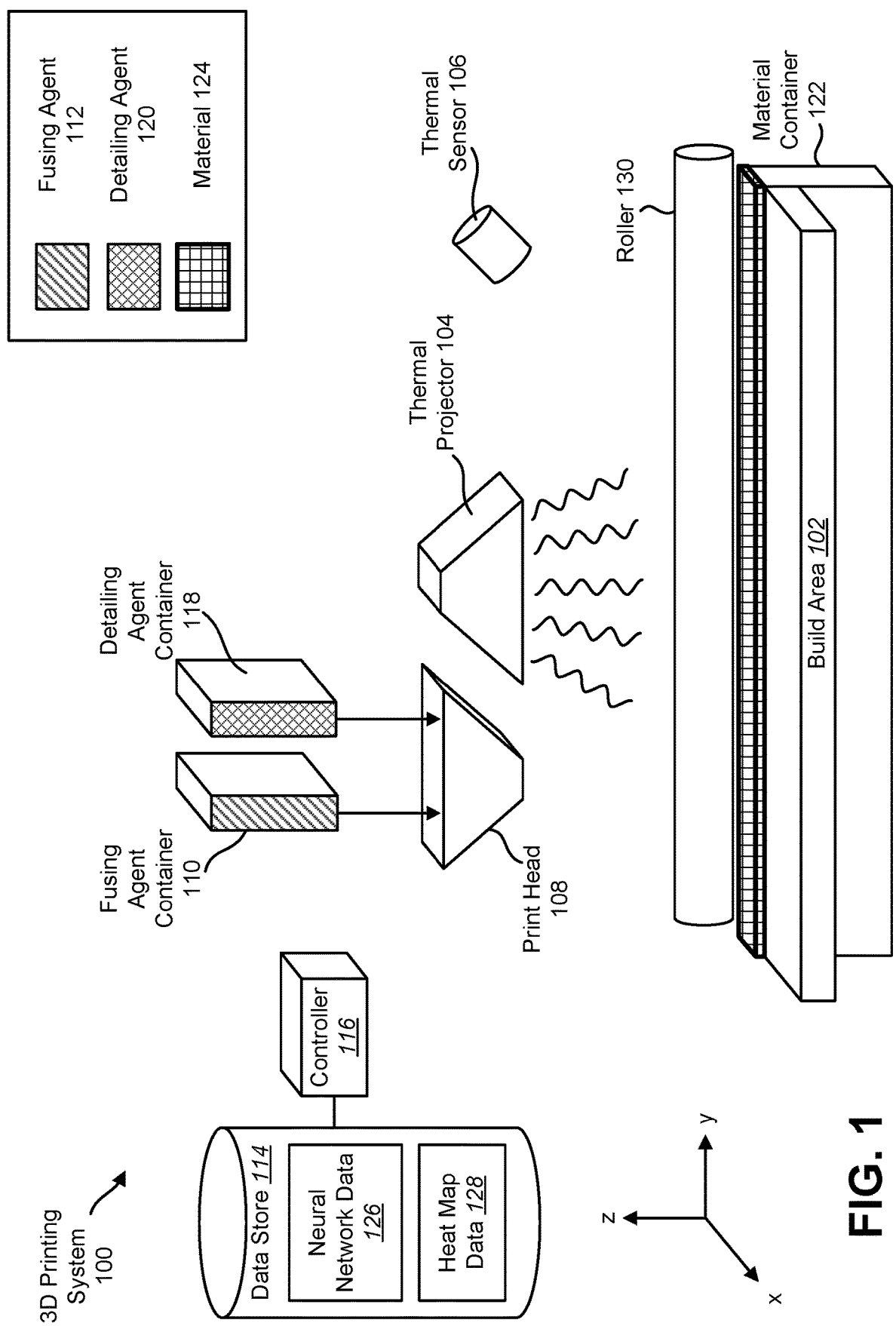
FIG. 1 is a simplified isometric view of an example of a three-dimensional (3D)-printing system that may be used in an example of a thermal behavior prediction method.

FIG. 1 is a simplified isometric view of an example of a 3D-printing system 100 that may be used in an example of a thermal behavior prediction method. The 3D-printing system 100 may include a controller 116, a data store 114, a build area 102, a print head 108, a fusing agent container 110, a detailing agent container 118, a roller 130, a material container 122, a thermal projector 104, and/or a thermal sensor 106. The example of a 3D-printing system 100 in FIG. 1 may include additional components that are not shown, and some of the components described may be removed and/or modified without departing from the scope of the 3D-printing system 100 in this disclosure. The components of the 3D-printing system 100 may not be drawn to scale, and thus, may have a size and/or configuration different than what is shown.

In the example of FIG. 1, the 3D-printing system 100 includes a fusing agent container 110, fusing agent 112, a detailing agent container 118, detailing agent 120, a material container 122, and material 124. In other examples, the 3D-printing system 100 may include more or fewer containers, agents, hoppers, and/or materials. The material container 122 may store material 124 that may be applied (e.g., spread) onto the build area 102 by the roller 130 for 3D printing. The fusing agent container 110 may store a fusing agent 112. The fusing agent 112 may be a substance (e.g., liquid, powder, etc.) that controls intake thermal intensity. For example, the fusing agent 112 may be selectively applied to cause applied material 124 to change phase with heat applied from the thermal projector 104 and/or to fuse with another layer of material 124. For instance, areas of material 124 where fusing agent 112 has been applied may eventually solidify into the object being printed. The detailing agent 120 may be a substance (e.g., liquid, powder, etc.) that controls outtake thermal intensity. For example, the detailing agent 120 may be selectively applied to detail edges of the object being printed.

In some configurations, the build area 102 may be the base of a "build volume," which may include a volume above the base. As used herein, the term "build area" may refer to the base of a build volume and/or another portion (e.g., another plane above the base) of the build volume.

In order to print a 3D object, the roller 130 may successively apply (e.g., spread) material 124 (e.g., a powder) and the print head 108 may successively apply and/or deliver fusing agent 112 and/or detailing agent 120. The thermal projector 104 may deliver energy (e.g., thermal energy, heat, etc.) to the material 124, fusing agent 112, and/or detailing agent 120 in the build area 102. For example, fusing agent 112 may be applied on a material 124 layer where particles (of the material 124) are meant to fuse together. Detailing agent 120 may be applied to modify fusing and create fine detail and/or smooth surfaces. The areas exposed to energy (e.g., thermal energy from the thermal projector 104) and reactions between the agents (e.g., fusing agent 112 and detailing agent 120) and the material 124 may cause the material 124 to selectively fuse together to form the object.

The print head 108 may be, for instance, a thermal inkjet print head, a piezoelectric print head, etc. The print head 108 may include a one or more nozzles (not shown) through which the fusing agent 112 and/or detailing agent 120 are extruded. In some examples, the print head 108 may span a dimension of the build area 102. Although a single print head 108 is depicted, multiple print heads 108 may be used that span a dimension of the build area 102. Additionally, one or more print heads 108 may be positioned in one or more print bars. The print head 108 may be attached to a carriage (not shown in FIG. 1). The carriage may move the print head 108 over the build area 102 in one or more dimensions.

The material 124 may be moved (e.g., scooped, lifted, and/or extruded, etc.) from the material container 122, and the roller 130 may apply (e.g., spread) the material 124 onto the build area 102 (on top of a current layer, for instance). In some examples, the roller 130 may span a dimension of the build area 102 (e.g., the same dimension as the print head 108 or a different dimension than the print head 108). Although a roller 130 is depicted, other means may be utilized to apply the material 124 to the build area 102. In some examples, the roller 130 may be attached to a carriage (not shown in FIG. 1). The carriage may move the roller 130 over the build area 102 in one or more dimensions. In some implementations, multiple material containers 122 may be utilized. For example, two material containers 122 may be implemented on opposite sides of the build area 102, which may allow material 124 to be spread by the roller 130 in two directions.

In some examples, the thermal projector 104 may span a dimension of the build area 102. Although one thermal projector 104 is depicted, multiple thermal projectors 104 may be used that span a dimension of the build area 102. Additionally, one or more thermal projectors 104 may be positioned in one or more print bars. The thermal projector 104 may be attached to a carriage (not shown in FIG. 1). The carriage may move the thermal projector 104 over the build area 102 in one or more dimensions.

In some examples, each of the print head 108, roller 130, and thermal projector 104 may be housed separately and/or may move independently. In some examples, two or more of the print head 108, roller 130, and thermal projector 104 may be housed together and/or may move together. In one example, the print head 108 and the thermal projector 104 may be housed in a print bar spanning one dimension of the build area 102, while the roller 130 may be housed in a carriage spanning another dimension of the build area 102. For instance, the roller 130 may apply a layer of material 124 in a pass over the build area 102, which may be followed by one or more passes of the print head 108 and thermal projector 104 over the build area 102.

The controller 116 may be a computing device, a semiconductor-based microprocessor, a Central Processing Unit (CPU), Graphics Processing Unit (GPU), Field-Programmable Gate Array (FPGA), an application-specific integrated circuit (ASIC), and/or other hardware device. The controller 116 may be connected to other components of the 3D-printing system 100 via communication lines (not shown).

The controller 116 may control actuators (not shown) to control operations of the components of the 3D-printing system 100. For example, the controller 116 may control one or more actuators that control movement of the print head 108 (along the x-, y-, and/or z-axes), one or more actuators that control movement of the roller 130 (along the x-, y-, and/or z-axes), and/or one or more actuators that control movement of the thermal projector 104 (along the x-, y-, and/or z-axes). The controller 116 may also control one or more actuators that control the amounts (e.g., proportions) of fusing agent 112 and/or detailing agent 120 to be deposited by the print head 108 from the fusing agent container 110 and/or detailing agent container 118. In some examples, the controller 116 may control one or more actuators that raise and lower build area 102 along the z-axis.

The controller 116 may communicate with a data store 114. The data store 114 may include machine-readable instructions that cause the controller 116 to control the supply of material 124, to control the supply of fusing agent 112 and/or detailing agent 120 to the print head 108, to control movement of the print head 108, to control movement of the roller 130, and/or to control movement of the thermal projector 104.

In some examples, the controller 116 may control the roller 130, the print head 108, and/or the thermal projector 104 to print a 3D object based on a 3D model. For instance, the controller 116 may utilize one or more contone maps that are based on the 3D model to control the print head 108. A contone map may indicate one or more locations (e.g., areas) for printing a substance (e.g., fusing agent 112 or detailing agent 120). In some examples, a contone map may include or indicate machine instructions (e.g., voxel-level machine instructions) for printing a substance. For example, a fusing agent contone map may indicate coordinates and/or an amount for printing the fusing agent 112. A detailing agent contone map may indicate coordinates and/or an amount for printing the detailing agent 120. In some examples, a contone map may correspond to a two-dimensional (2D) layer (e.g., 2D slice, 2D cross-section, etc.) of the 3D model. For instance, a 3D model may be processed to produce a plurality of contone maps corresponding to a plurality of layers of the 3D model. In some examples, a contone map may be expressed as a 2D grid of values, where each value may indicate whether to print an agent and/or an amount of agent at the location on the 2D grid. For instance, the location of a value in the 2D grid may correspond to a location in the build area 102 (e.g., a location (x, y) of a particular level (z) at or above the build area 102). In some examples, a contone map may be a compressed version of the aforementioned 2D grid or array (e.g., a quadtree).

The data store 114 may be machine-readable storage medium. Machine-readable storage may be any electronic, magnetic, optical, or other physical storage device that stores executable instructions. Thus, machine-readable storage medium may be, for example, Random Access Memory (RAM), an Electrically Erasable Programmable Read-Only Memory (EEPROM), a storage drive, an optical disc, and the like. As described herein, a machine-readable storage medium may be encoded with executable instructions for controlling the 3D-printing system 100.

In some examples, the data store 114 may store neural network data 126 and/or heat map data 128. The neural network data 126 may include data defining one or more neural networks. For instance, the neural network data 126 may define one or more nodes, one or more connections between nodes, one or more network layers, and/or one or more neural networks. Examples of neural networks include convolutional neural networks (CNNs) and recurrent neural networks (RNNs) (e.g., basic RNN, multi-layer RNN, bi-directional RNN, fused RNN, clockwork RNN, etc.). Some approaches may utilize one or more variants of RNN (e.g., Long Short Term Memory Unit (LSTM), peephole LSTM, no input gate (NIG), no forget gate (NFG), no output gate (NOG), no input activation function (NIAF), no output activation function (NOAF), no peepholes (NP), coupled input and forget gate (CIFG), full gate recurrence (FGR), gated recurrent unit (GRU), etc.). Different depths of one or more neural networks may be utilized. For example, a neural network with a depth of 4 may be utilized. It should be noted that one or more other deep neural networks with larger depth may be utilized in some examples.

In some examples, a neural network may include an input layer, an encoder layer, a mapping layer, a decoder layer, and/or an output layer. For example, next to the input layer, the encoder layer may extract features from inputs. The mapping layer may carry out non-linear mapping between input features and output features. The mapping layer may be situated between the encoder layer and the decoder layer. The decoder layer may translate features into an output domain and may be situated before the output layer. Each layer may include one or more nodes (e.g., more than one node (or perceptron)) in some implementations.

In some examples, the controller 116 may utilize the one or more neural networks (defined by the neural network data 126) to compute one or more predicted thermal behavior (e.g., one or more heat maps) corresponding to a 3D model. Thermal behavior may indicate temperature (or thermal energy) in an area. For example, the controller 116 may compute, using one or more neural networks, a predicted heat map of a layer corresponding to a 3D model based on one or more contone maps corresponding to a 3D model. For instance, thermal behavior may be expressed as one or more heat maps in some examples. A heat map may be a 2D grid of heat values, where each heat value indicates a temperature (or thermal energy) corresponding to a location in the 2D grid. Each location in the 2D grid may correspond to a location in the build area 102 (e.g., a location (x, y) of a particular level (z) at or above the build area 102). The one or more contone maps may be utilized as inputs to the one or more neural networks. For instance, voxel-level contone map(s) may be used because the contone map(s) may enable voxel-level energy control. The predicted heat map(s) may be stored in the data store 114 as heat map data 128. Thermal behavior may be predicted in one or more ways. For example, thermal behavior (e.g., a heat map) may be predicted for a layer that has not yet been applied and/or printed. Additionally or alternatively, thermal behavior (e.g., a heat map) may be predicted for a layer at a time after application and/or printing.

A contone map may be a representation of agent placement (e.g., placement and/or quantity for a fusing agent and/or placement and/or quantity for a detailing agent). While one or more contone maps are given as examples of data input into the neural network(s), other information or data may be utilized in addition to or alternatively from contone maps. For example, slices may be utilized to assist predicting one or more heat maps and/or may be utilized as an alternative learning dataset. In particular, slices may be used instead of one or more contone maps or in addition to one or more contone maps in some examples.

In some examples, the thermal sensor 106 may capture one or more thermal images of the build area 102. For instance, the thermal sensor 106 may be an infrared thermal sensor (e.g., camera) that captures thermal images of the build area 102 (e.g., applied material in the build area 102). The thermal image(s) may indicate thermal variation (e.g., temperature variation) over the build area 102. In some implementations, a thermal image may be a 2D grid of sensed temperatures (or thermal energy). For example, thermal sensing over the build area 102 may indicate (e.g., capture and encapsulate) environmental complexity and heterogeneous thermal diffusivity. In some approaches, the thermal image(s) may be transformed to align with one or more contone maps (e.g., registered with the contone map(s)).

In some examples, the controller 116 may compute a predicted heat map based on the thermal image(s). For instance, the controller 116 may utilize the contone map(s) and thermal image(s) as inputs to the neural network(s). The neural network(s) may be used to compute the predicted heat map(s) based on the contone map(s) and the thermal image(s).

A thermal image may correspond to a layer at a particular time (e.g., at a time the thermal image is captured). Computing the predicted heat map may include computing the predicted heat map of the layer at a time after the particular time.

A thermal image may be utilized to train the neural network(s) in some examples. For instance, the controller 116 may compute a loss function based on the predicted heat map and the thermal image. The neural network(s) may be trained based on the loss function.

In some examples, the neural network data 126 may define a neural network architecture with multiple neural networks. The neural network architecture may account for different thermal drivers (e.g., voxel-level thermal influences on a top layer). For example, the neural network architecture may include a first neural network (e.g., a CNN) that accounts for thermal sourcing/sinking, a second neural network (e.g., a RNN) that accounts for 3D (e.g., heterogeneous) thermal diffusion, and a third neural network (e.g., a CNN) that computes different contributions from these two effects (thermal sourcing/sinking and thermal diffusion) to the final heat map prediction. While examples of neural network architectures using multiple neural networks are given, it should be noted that neural network architectures using a single neural network may alternatively be used.

It should be noted that computational cost may be high for training deep neural networks. In order to address the high computational cost, some examples may use a computationally scalable approach where each layer of the build area 102 is partitioned into a set of tiles (e.g., 2D subsets of the build area 102 or of a level above the build area 102). In some examples, the controller 116 may partition the build area 102 into a set of tiles. Each tile may be a fundamental training unit. For instance, the set of tiles may be tuned for computing resource allowance.

In some examples, one or more thermal stripes may be computed to account for tile-to-tile interaction. The tile-to-tile interaction may include thermal diffusive effects between tiles, such as thermal flux due to a temperature differential between a tile and neighboring tiles that drives thermal energy penetrating into neighboring tiles from the boundary of the tile. For instance, the controller 116 may determine one or more thermal stripes overlapping between at least two tiles (e.g., neighboring tiles) in the set of tiles. In some approaches, a thermal stripe may be computed for all directions (e.g., each side of a tile). The width of a thermal stripe may be computed based on thermal diffusivity and layer production time (e.g., tuned by thermal diffusion given layer build time). The thermal stripe(s) may allow for thermal coupling among tiles. Utilizing thermal stripes may enable prediction of effects beyond tile size (e.g., spatial influences larger than tile size such as large print objects and the influence of location in the build area 102). In some examples, computing the predicted heat map may be based on the one or more thermal stripes. For instance, the controller 116 may compute the predicted heat map based on the thermal stripe(s).

In some examples, the controller 116 may print one or more layers based on the predicted heat map. For instance, the controller 116 may control the amount and/or location of fusing agent 112 and/or detailing agent 120 for a layer based on the predicted heat map. In some examples, the controller 116 may drive model setting (e.g., the size of the stride) based on the predicted heat map (e.g., thermal diffusion). Additionally or alternatively, the controller 116 may perform offline print mode tuning based on the predicted heat map. For example, if the predicted heat map indicates systematic bias (e.g., a particular portion of the build area is consistently colder or warmer than baseline), the data pipeline may be altered such that the contone maps are modified to compensate for such systematic bias. For instance, if the predicted heat map indicates a systematic bias, the controller 116 may adjust contone map generation (for one or more subsequent layers, for example) to compensate for the bias. Accordingly, the location and/or amount of agent(s) deposited may be adjusted based on the contone map(s) to improve print accuracy and/or performance.

Figure 2:
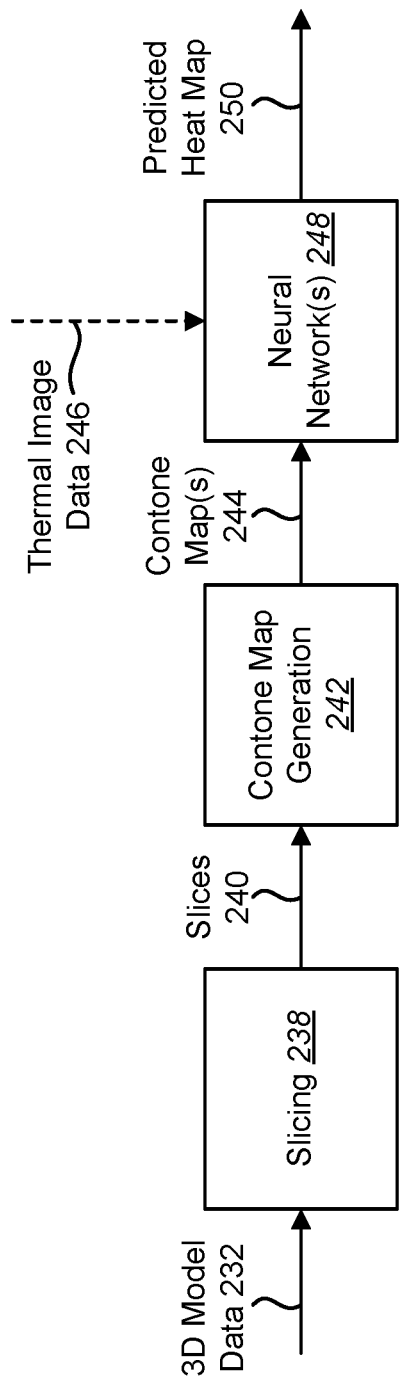
FIG. 2 is a block diagram illustrating examples of functions that may be implemented to compute a predicted heat map.

FIG. 2 is a block diagram illustrating examples of functions that may be implemented to compute a predicted heat map 250. In some examples, one or more of the functions described in connection with FIG. 2 may be performed by the controller 116 described in connection with FIG. 1. For instance, instructions for slicing 238, contone map generation 242, and/or neural network(s) 248 may be stored in the data store 114 and executed by the controller 116 in some examples. In other examples, slicing 238 and/or contone map generation 242 may be performed by another apparatus. For instance, slicing 238 may be carried out on a separate apparatus and sent to the 3D printing system 100.

3D model data 232 may be obtained. For example, the 3D model data 232 may be received from another device and/or generated. The 3D model data may specify shape and/or size of a 3D model for printing a 3D object. 3D model data 232 can define both the internal and the external portion of the 3D object. The 3D model data 232 can be defined, for example, using polygon meshes. For example, the 3D model data 232 can be defined using a number of formats such as a 3MF file format, an object (OBJ) file format, and/or a stereolithography (STL) file format, among other type of files formats.

Slicing 238 may be performed based on the 3D model data 232. For example, slicing 238 may include generating a set of 2D slices 240 corresponding to the 3D model data 232. In some approaches, the 3D model indicated by the 3D model data 232 may be traversed along an axis (e.g., a vertical axis, z-axis, or other axis), where each slice 240 represents a 2D cross section of the 3D model. For example, slicing 238 the 3D model can include identifying a z-coordinate of a slice plane. The z-coordinate of the slice plane can be used to traverse the 3D model to identify one or more portions of the 3D model intercepted by the slice plane.

Contone map generation 242 may be performed based on the slices 240. In some examples, one or more contone maps 244 may be generated 242 for each slice 240. For instance, contone map generation 242 may include generating a fusing contone map and a detailing contone map, where the fusing contone map indicates one or more areas and density distribution for printing fusing agent for a layer and the detailing contone map indicates one or more areas and density distribution for printing detailing agent for the layer. The contone map(s) 244 may be represented in one or file formats in some examples. For instance, a contone map 244 may be formatted as a BKZ contone file, a SIF contone file, and/or another kind of contone file.

The neural network(s) 248 may be used to compute (e.g., predict) a predicted heat map 250 based on the contone map(s) 244. In some examples, computing the predicted heat map 250 may also be based on thermal image data 246. For example, a first neural network 248 may use the contone map(s) 244 in the computation of a first predicted heat map, a second neural network 248 may use the thermal image data 246 in the computation of a second predicted heat map, and a third neural network 248 may use the first predicted heat map and the second predicted heat map in the computation of the predicted heat map 250 (e.g., final predicted heat map). A more detailed example of neural networks 248 is given in connection with FIG. 5.

Figure 3:
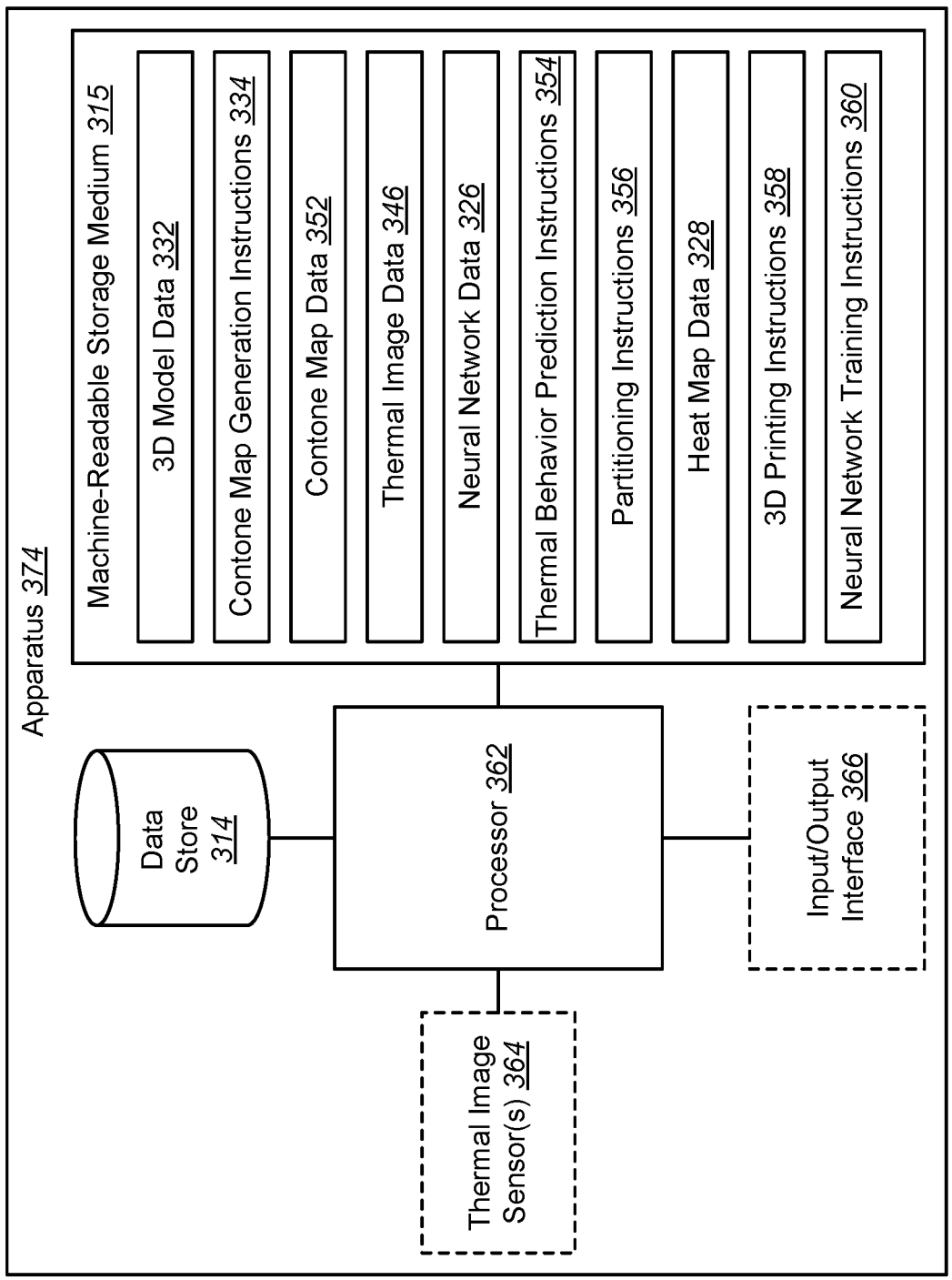
FIG. 3 is a block diagram of an example of an apparatus that may be used in an example of a method for thermal behavior prediction.

FIG. 3 is a block diagram of an example of an apparatus 374 that may be used in an example of a method for thermal behavior prediction. The apparatus 374 may be a computing device, such as a personal computer, a server computer, a printer, a 3D printer, a smartphone, a tablet computer, etc. The apparatus 374 may include a processor 362, a data store 314, an input/output interface 366, a machine-readable storage medium 315, and/or one or more thermal image sensors 364. The apparatus 374 may be an example of the 3D printing system 100 described in connection with FIG. 1 or the 3D printing system may be an example of the apparatus 374 in some implementations. For instance, the processor 362 may be an example of the controller 116 described in connection with FIG. 1, the data store 314 may be an example of the data store 114 described in connection with FIG. 1, and the thermal image sensor(s) 364 may be an example of the thermal sensor 106 described in connection with FIG. 1. The apparatus 374 may include additional components (not shown) and/or some of the components described herein may be removed and/or modified without departing from the scope of this disclosure.

The processor 362 may be any of a central processing unit (CPU), a semiconductor-based microprocessor, graphics processing unit (GPU), FPGA, an application-specific integrated circuit (ASIC), and/or other hardware device suitable for retrieval and execution of instructions stored in the machine-readable storage medium 315. The processor 362 may fetch, decode, and/or execute instructions (e.g., contone map generation instructions 334, thermal behavior prediction instructions 354, partitioning instructions 356, 3D printing instructions 358, and/or neural network training instructions 360) stored on the machine-readable storage medium 315. Additionally or alternatively, the processor 362 may include one or more electronic circuits that include electronic components for performing one or more functionalities of the instructions (e.g., contone map generation instructions 334, thermal behavior prediction instructions 354, partitioning instructions 356, 3D printing instructions 358, and/or neural network training instructions 360). It should be noted that the processor 362 may be configured to perform one or more of the functions, operations, steps, methods, etc., described in connection with one or more of FIGS. 1-2 and/or 4-7 in some examples.

The machine-readable storage medium 315 may be any electronic, magnetic, optical, or other physical storage device that contains or stores electronic information (e.g., instructions and/or data). Thus, the machine-readable storage medium 315 may be, for example, RAM, EEPROM, a storage device, an optical disc, and the like. In some implementations, the machine-readable storage medium 315 may be a non-transitory machine-readable storage medium, where the term "non-transitory" does not encompass transitory propagating signals.

The apparatus 374 may also include a data store 314 on which the processor 362 may store information. The data store 314 may be volatile and/or non-volatile memory, such as DRAM, EEPROM, magnetoresistive random-access memory (MRAM), phase change RAM (PCRAM), memristor, flash memory, and the like. In some examples, the machine-readable storage medium 315 may be included in the data store 314. Alternatively, the machine-readable storage medium 315 may be separate from the data store 314. In some approaches, the data store 314 may store similar instructions and/or data as that stored by the machine-readable storage medium 315. For example, the data store 314 may be non-volatile memory and the machine-readable storage medium 315 may be volatile memory.

The apparatus 374 may further include an input/output interface 366 through which the processor 362 may communicate with an external device(s) (not shown), for instance, to receive and store the information pertaining to the object(s) to be printed. The input/output interface 366 may include hardware and/or machine-readable instructions to enable the processor 362 to communicate with the external device(s). The input/output interface 366 may enable a wired or wireless connection to the output device(s). The input/output interface 366 may further include a network interface card and/or may also include hardware and/or machine-readable instructions to enable the processor 362 to communicate with various input and/or output devices, such as a keyboard, a mouse, a display, another apparatus, electronic device, computing device, etc., through which a user may input instructions into the apparatus 374.

The machine-readable storage medium 315 may store 3D model data 332. The 3D model data may be generated by the apparatus 374 and/or received from another device. One example of the 3D model data 332 may include a 3D mesh. In some examples, the machine-readable storage medium 315 may include slicing instructions (not shown in FIG. 3). The processor 362 may execute the slicing instructions to perform slicing on the 3D model data 332 to produce a stack of 2D vector slices as described in connection with FIG. 2.

The processor 362 may execute the contone map generation instructions 334 to produce contone map data 352. For example, the contone map generation instructions 334 may be executed to account for printing process physics to generate the contone map data 352. The contone map data 352 may indicate agent distribution (e.g., fusing agent distribution and/or detailing agent distribution) at the voxel level for printing a 3D object. In some examples, the contone map data 352 may be a part of 3D printing instructions 358. For instance, the 3D printing instructions 358 may include the contone map data 352 as per-layer machine instructions (e.g., voxel-level machine instructions) for agent distribution.

One or more contone maps may be utilized per layer corresponding to the 3D model. For instance, a fusing contone map may indicate a map for fusing agent distribution, where the fusing agent controls intake thermal intensity. Additionally or alternatively, a detailing contone map may indicate a map for detailing agent distribution, where the distribution agent controls outtake thermal intensity. In some implementations, the processor 362 may utilize the contone map data 352 (as part of 3D printing instructions, for example) to control energy deposition at the voxel level. The contone map data 352 (at the voxel level for each agent, for example) may be used to manipulate energy at a voxel-level resolution. Accordingly, the contone map data 352 may be useful in predicting a heat map, which may be fed back to improve voxel-level energy control.

It should be noted that multiple different agent contone maps corresponding to different abilities to absorb or remove thermal energies may be utilized in some examples. Additionally or alternatively, some examples may utilize different print modes where multiple contone maps may be used for each agent.

For a given layer (e.g., a current layer, a top layer, etc.), the contone map(s) of all agents deposited to the layer may be the primary voxel-level energy driving force in some examples. It should be noted that another voxel-level energy influencer may include neighboring voxels in previous layers that may have a temperature differential compared to a given voxel, which may induce heat flux into or out of the voxel.

In some examples, the machine-readable storage medium 315 may store thermal image data 346. The thermal image data 346 may be obtained (e.g., received) from one or more thermal image sensors. In some examples, the apparatus 374 may include one or more thermal image sensors 364, may be coupled to one or more remote thermal image sensors, and/or may receive thermal image data 346 (e.g., one or more thermal images) from one or more (integrated and/or remote) thermal image sensors. Some examples of thermal image sensors 364 include thermal cameras (e.g., infrared cameras). Other kinds of thermal sensors may be utilized. In some examples, thermal sensor resolution may be less than voxel resolution (e.g., each temperature readout may cover an area that includes multiple voxels). In other examples, the thermal image sensor(s) 364 may provide voxel-level (or near voxel-level) thermal sensing.

The thermal image data 346 may include one or more thermal images. A thermal image may be an image that indicates heat (e.g., temperature) over an area and/or volume. For example, a thermal image may indicate a build area temperature distribution (e.g., thermal temperature distribution over a top layer). In some examples, the thermal image sensor(s) 364 may undergo a calibration procedure to overcome distortion introduced by the thermal image sensor(s) 364. For example, a thermal image may be transformed to register the thermal image with the contone map(s). Different types of thermal sensing devices may be used in different examples.

The machine-readable storage medium may store neural network data 326. The neural network data 326 may include data defining one or more neural networks. For instance, the neural network data 326 may define one or more nodes, one or more connections between nodes, one or more network layers, and/or one or more neural networks. Examples of neural networks are described in connection with FIG. 1. A specific example of a neural network architecture is described in connection with FIG. 5.

The machine-readable storage medium may store thermal behavior prediction instructions 354. The processor 362 may execute the thermal behavior prediction instructions 354 to predict thermal behavior (e.g., one or more heat maps) using one or more neural networks defined by the neural network data 326. In some examples, the neural network(s) may use one or more contone maps as input for predicting thermal behavior (e.g., one or more heat maps). Additionally or alternatively, the neural network(s) may use one or more thermal images as input for predicting thermal behavior (e.g., one or more heat maps). One or more predicted heat maps may be stored as heat map data 328 on the machine-readable storage medium 315. Additionally or alternatively, one or more predicted heat maps may be sent to another device (e.g., a remote 3D printing system).

In some examples, the machine-readable storage medium 315 may store partitioning instructions 356. The processor 362 may execute the partitioning instructions 356 to partition a build area into a set of tiles. For instance, the processor 362 may partition a build area (e.g., a layer above the build area) into a set of tiles and/or may compute one or more thermal stripes between tiles. In some examples, the processor 362 may compute at least one thermal stripe between at least two tiles, where computing the width of each thermal stripe is based on thermal diffusivity and layer production time. The thermal stripe(s) may account for thermal interaction between tiles. Partitioning and/or computing thermal stripe(s) may improve computational (e.g., training) efficiency.

In some examples, the machine-readable storage medium 315 may store 3D printing instructions 358. For instance, the processor 362 may execute the 3D printing instructions 358 to print one or more 3D objects. In some implementations, the 3D printing instructions 358 may include instructions for controlling one or more devices (e.g., rollers, print heads, and/or thermal projectors, etc.). For example, the 3D printing instructions 358 may use one or more contone maps (stored as contone map data 352, for instance) to control one or more print heads to print one or more agents in one or more locations specified by the contone map(s). In some examples, the processor 362 may execute the 3D printing instructions 358 to print one or more layers based on a predicted heat map (stored as heat map data 328, for instance).

In some examples, the machine-readable storage medium 315 may store neural network training instructions 360. The processor 362 may execute the neural network training instructions 360 to train one or more neural networks (defined by the neural network data 326, for instance). For example, the neural network training instructions 360 may include a loss function. The processor 362 may compute the loss function based on a predicted heat map and a thermal image. For example, the thermal image may provide the ground truth (which may or may not be at voxel-level) for the loss function. The loss function may be utilized to train one or more neural networks. For example, one or more node and/or connection weights in the neural network(s) may be adjusted based on the loss function in order to improve the prediction accuracy of the neural network(s). It should be noted that not all of the steps and/or features described in connection with FIG. 3 may be required in all implementations.

Figure 4:
FIG. 4 is a flow diagram illustrating an example of a thermal behavior prediction method.

FIG. 4 is a flow diagram illustrating an example of a thermal behavior prediction method. The 3D-printing method 400 may be performed by, for example, the apparatus 374 described in connection with FIG. 3 (and/or by the 3D printing system 100 described in connection with FIG. 1). The apparatus 374 may obtain 402 a contone map corresponding to a 3D model. For example, the apparatus 374 may generate one or more contone maps based on a 3D model and/or may receive one or more contone maps from another device.

The apparatus 374 may compute 404, using at least one neural network, a predicted heat map of a layer corresponding to the 3D model based on the contone map. For instance, at least one neural network may utilize one or more contone maps (e.g., voxel-level machine instructions) to predict the heat map. In some examples, the apparatus 374 may compute, using a first neural network (e.g., a CNN), a first predicted heat map based on the contone map. The apparatus 374 may also compute, using a second neural network (e.g., a RNN), a second predicted heat map based on a thermal image. The apparatus 374 may further compute, using a third neural network (e.g., another CNN), the predicted heat map based on the first predicted heat map and the second predicted heat map. In some examples, computing 404 the predicted heat map may be independent of thermal sensing (e.g., independent of thermal sensing after the neural network(s) are trained). For instance, the neural network(s) may utilize one or more contone maps as input and may not utilize a thermal image as input in the thermal behavior prediction.

Figure 5:
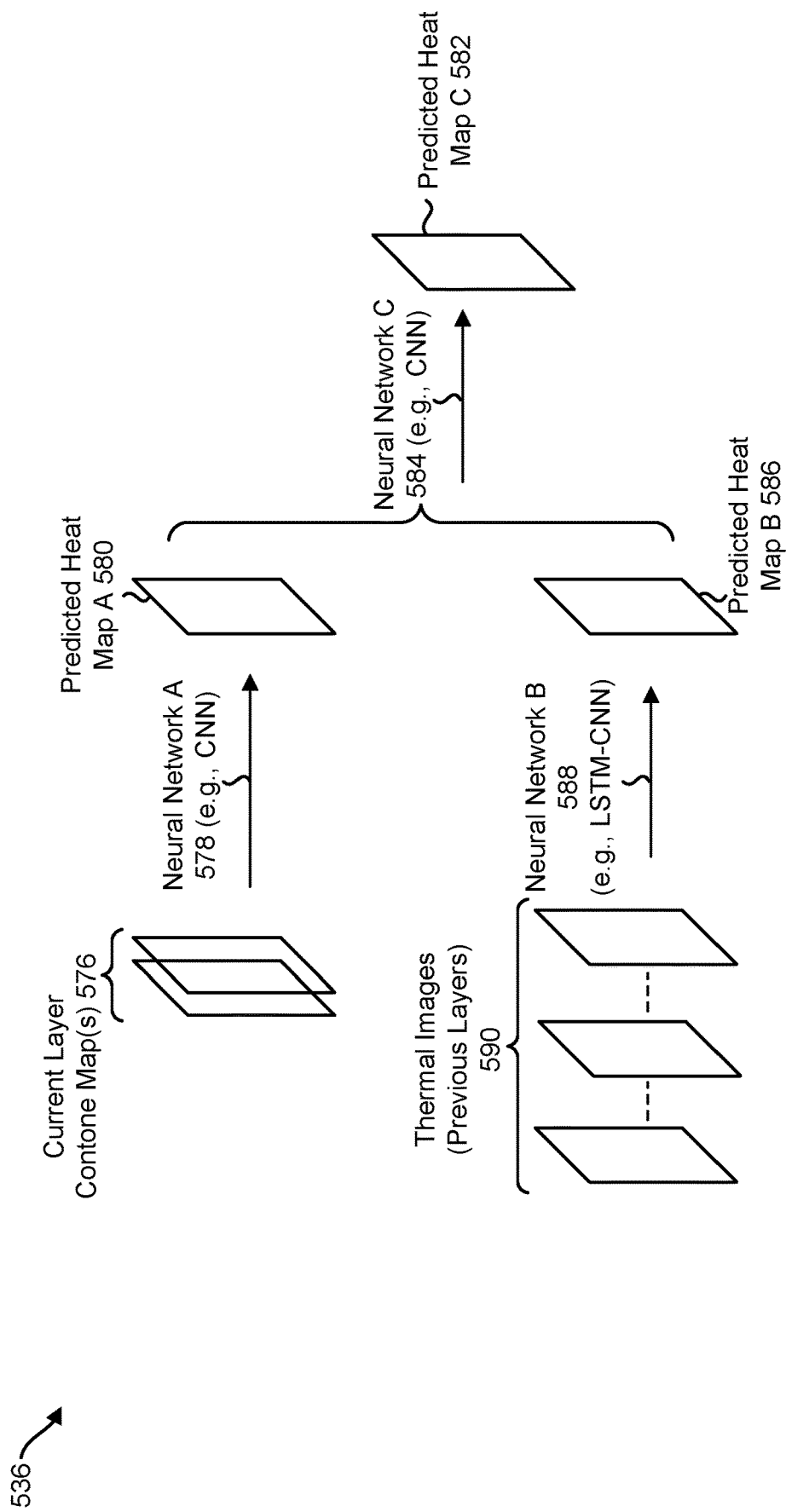
FIG. 5 is a diagram illustrating an example of a neural network architecture.

FIG. 5 is a diagram illustrating an example of a neural network architecture 536. The neural network architecture 536 includes neural network A 578, neural network B 588, and neural network C 584. In some examples, neural network A 578, neural network B 588, and neural network C 584 may be stored as (and/or defined by) neural network data 126, 326 as described in connection with one or more of FIGS. 1 and 3.

As illustrated in FIG. 5, neural network A 578 may be utilized to compute predicted heat map A 580 (e.g., compute a current layer heat prediction) based on one or more current layer contone maps 576 (e.g., a current layer fusing contone map and/or a current layer detailing contone map). For example, neural network A 578 may learn (e.g., may be trained) to predict a heat map based on the current layer contone map(s) 576. For instance, neural network A 578 may learn a heat map generated by a voxel energy map (e.g., fusing agent and/or detailing agent). In some approaches, the "current layer" may refer to a top layer that has not yet been printed (e.g., a next layer to be printed).

In some examples, neural network A 578 may be a CNN. Due to the role of contone maps of current layer thermal behavior, a CNN may be utilized to generate a quantitative predictive model for the thermal component attributed to the current layer contone maps 576. For instance, neural network A 578 (e.g., a CNN) may account for spatial thermal sourcing and sinking.

As illustrated in FIG. 5, neural network B 588 may be utilized to compute predicted heat map B 586 (e.g., compute a current layer heat prediction) based on one or more thermal images 590 (e.g., thermal images corresponding to previous layers). For example, neural network B 588 may learn (e.g., may be trained) to predict a heat map based on the thermal image(s) 590 from one or more previous layers. For instance, neural network B 588 may learn layer heat transferred from one or more previous layers, which may simulate heat transfer.

In some examples, neural network B 588 may be a RNN (e.g., LSTM). In some implementations, neural network B 588 may be a combination of a CNN and an RNN (e.g., LSTM-CNN). In recognition of voxel-level thermal coupling among different layers (e.g., for a voxel at a current layer), if there is a temperature differential between a voxel and the surrounding voxels belonging to previous layers, a heat flux may be generated about the voxel. An RNN may be used to generate a quantitative model for the thermal component attributed to one or more layers (e.g., thermal images 590 of previous layers). Neural network B 588 (e.g., an RNN) may account for inter-layer effects. In some implementations, a LSTM RNN may be used, which overcomes numerical instability issues. In some implementations, a CNN may be coupled to the RNN (e.g., LSTM) at each network layer to account for the thermal diffusion within each layer (e.g., previous and current layers).

In some examples, neural network B 588 may account for spatiotemporal effects. For instance, a convolutional recurrent neural network may be able to simulate, quantitatively, transient 3D thermal diffusion by accounting for inter-layer coupling (z-) and spatial diffusion (x- and y-). This approach may simulate a given layer's thermal physics at a later time (e.g., second time) when given a snapshot of the thermal behavior of the layer as input at an earlier time (e.g., first time). For example, not only can the thermal diffusion with previous layers be simulated, but also with one or more layers applied on top of a layer (e.g., subsequent or "future" layers). In some approaches (e.g., architectures), thermal sensing data (e.g., a thermal image) for any given layer (when the layer was the top layer) may be used as input, and the neural network(s) may capture and estimate (e.g., predict) future thermal behavior of the layer.

It should be noted that although the neural network architecture 536 of FIG. 5 illustrates one structure, other variations may be implemented. For example, the thermal sensing data (e.g., a thermal image) representing a layer may be replaced by a CNN with one or more contone maps for the layer as input. In this way, the thermal sensing data (e.g., thermal image) may not be part of model. For example, a predicted heat map may be computed independent of thermal sensing. The thermal sensing data (e.g., thermal image), may be utilized as ground truth to generate a loss function to improve model (e.g., neural network) training. Once the model (e.g., neural network(s)) is trained, the thermal behavior prediction may be independent of the thermal sensing dataset. This may enable a smaller model size for deployment.

As illustrated in FIG. 5, neural network C 584 may be utilized to compute predicted heat map C 582 (e.g., compute a current layer final heat prediction) based on one or more predicted heat maps (e.g., predicted heat map A 580 and predicted heat map B 586). For example, neural network C 584 may learn (e.g., may be trained) to predict a heat map based on both predicted heat map A 580 and predicted heat map B 586. For instance, neural network C 584 may learn the contributions of neural network A 578 (e.g., predicted heat map A 580) and neural network B 588 (e.g., predicted heat map B 586) and synthesize the contributions. In some examples, neural network C 584 may be a CNN. For example, all the predicted thermal components may be synthesized by a CNN to account for different levels of contribution to the final prediction.

In some examples, predicted heat map C 582 may be compared to a thermal sensing data ground truth (e.g., thermal image) to generate a loss function. As described herein, the loss function may be utilized to drives weight trainings for one or more neural networks (e.g., neural network A 578, neural network B 588, and/or neural network C 584). In some examples, neural network A 578 may be referred to as a spatial neural network (to account for spatial thermal sourcing and sinking, for instance), neural network B 588 may be referred to as a spatiotemporal neural network (to account for 3D temporal diffusion, for instance), and neural network C 584 may be referred to as a synthesis neural network (to synthesis contributions from other neural networks, for instance).

It should be noted that other variations of neural network architectures may be utilized to predict a heat map. For instance, instead of three stages (e.g., CNN, LSTM-CNN, and CNN) in the neural network architecture 536, other architectures may be implemented. In some examples, the current layer contone map(s) may be provided to a LSTM-CNN stage. This may provide a simplified neural network architecture.

Instead of LSTM, other types of RNN may be utilized to account for time dependency (e.g., no input gate (NIG), no forget gate (NFG), no output gate (NOG), no input activation function (NIAF), no output activation function (NOAF), no peepholes (NP), coupled input and forget gate (CIFG), full gate recurrence (FGR), and/or gated recurrent unit (GRU), etc.). In some approaches, a CNN may be incorporated into an RNN to account for spatial dependency.

Figure 6:
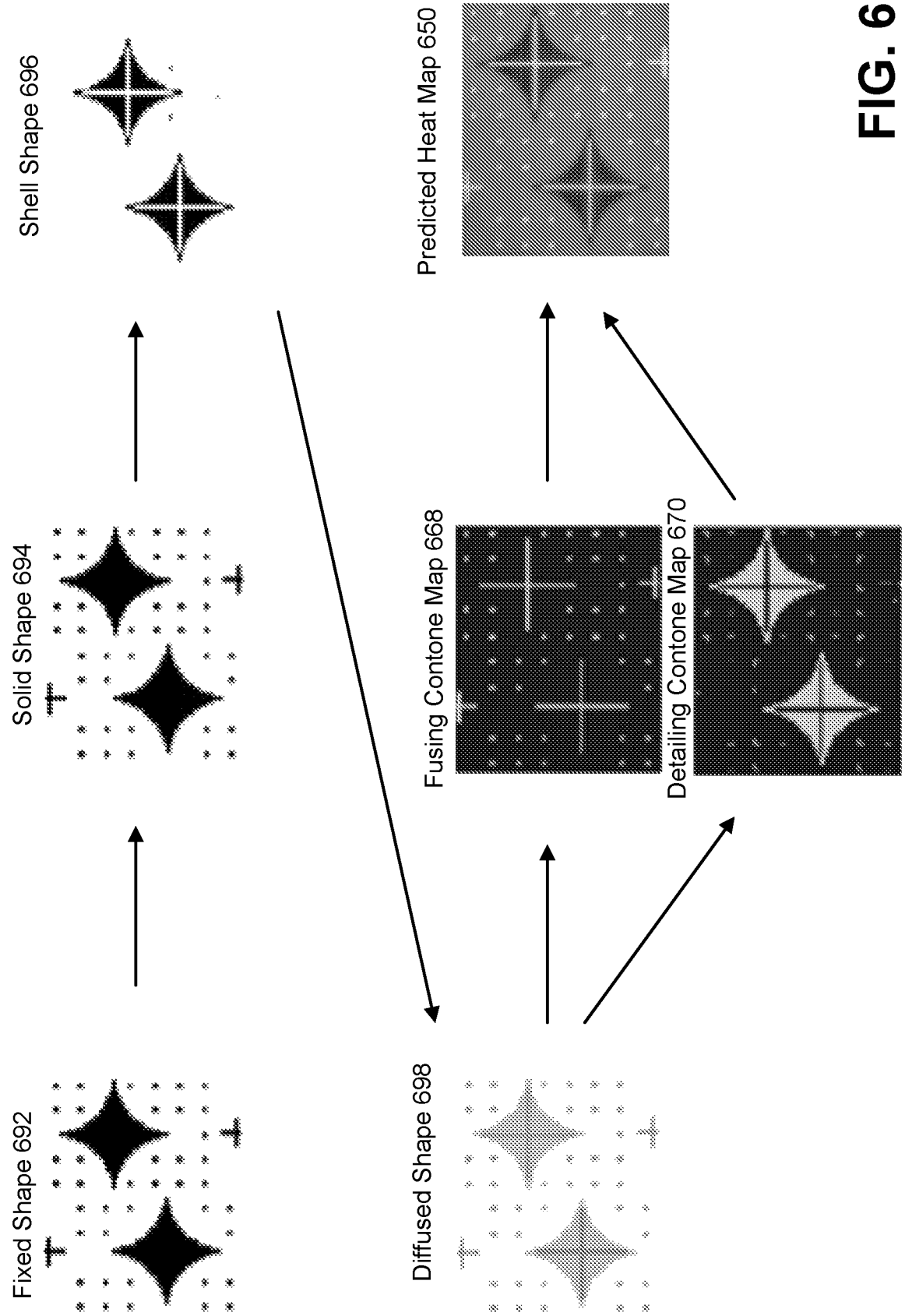
FIG. 6 is a diagram illustrating an example of computing a predicted heat map.

FIG. 6 is a diagram illustrating an example of computing a predicted heat map 650. In particular, FIG. 6 illustrates an example of steps for generating contone maps 668, 670 based on 3D model data and computing a predicted heat map 650 based on the contone maps. In this example, 3D model data (e.g., a 3MF design file) is obtained. For instance, a .3mf design file may be processed to obtain a geometry file, which may be processed to obtain a .sif contone file, which may be processed to obtain one or more contone maps (e.g., contone images). In this example, a fixed shape 692, solid shape 694, shell shape 696, and diffused shape 698 may be derived from 3D model data. The shape data may be utilized to generate a fusing contone map 668 and a detailing contone map 670. As described herein, a predicted heat map 650 may be computed based on the contone maps 668, 670.

Other approaches may be utilized. In other examples, a .3mf design file may be processed to obtain a .trf layer transformation file, which may be processed to obtain a .bkz contone file, which may be processed to obtain one or more contone maps (e.g., contone images). For instance, shape data may be utilized to generate a fusing contone map and a detailing contone map. In some approaches, contone map generation may be carried out in accordance with one or more of the examples described in connection with FIG. 6. For instance, the 3D printing system 100 described in connection with FIG. 1, the contone map generation 242 described in connection with FIG. 2, and/or the contone map generation instructions 334 described in connection with FIG. 3 may be carried out in accordance with one or more of the examples described in connection with FIG. 6.

FIG. 7 illustrates examples of a contone fusing map 768, a contone detailing map 770, a thermal image 772, and a predicted heat map 750. One or more of the functions, operations, approaches, and/or methods, etc., described herein may be utilized to compute the predicted heat map 750 based on the contone fusing map 768 and the contone detailing map 770. The thermal image 772 may represent the ground truth, where the predicted heat map 750 compares favorably with the thermal image 772.

It should be noted that some of the approaches may enable learning from previous layers, which may be useful to predict patterns that may not appear in contone maps. For example, neural networks may learn an influence in temperature from a previous layer and predict transfer of the influence to the current layer. It should be noted that even in cases where contone maps are blank, some approaches may still capture actual patterns in thermal behavior. One or more neural networks may learn valuable information from previous layers and timely predict shape change based on contone maps. Energy absorption or loss from fusing and detailing agent maps and heat transferred from previous layers may be significant in actual thermal behavior, and may be effectively captured by some of the neural network prediction approaches described herein.

What is claimed is:

1. A method for thermal behavior prediction by an electronic device, comprising:
   computing, using at least one convolutional neural network, a predicted heat map of a layer corresponding to a three-dimensional (3D) model, wherein said computing is based on a contone map corresponding to the 3D model, wherein the contone map comprises a set of values indicative of agent placement;
   partitioning a build area into a set of tiles;
   determining one or more thermal stripes overlapping between at least two tiles in the set of tiles, wherein computing the predicted heat map is based on the one or more thermal stripes; and
   printing the layer based on the predicted heat map.

2. The method of claim 1, further comprising obtaining a thermal image of a build area, and wherein said computing the predicted heat map is further based on the thermal image.

3. The method of claim 2, wherein said computing the predicted heat map comprises:
   computing, using a first neural network, a first predicted heat map based on the contone map;
   computing, using a second neural network, a second predicted heat map based on the thermal image; and
   computing, using a third neural network, the predicted heat map based on the first predicted heat map and the second predicted heat map.

4. The method of claim 3, wherein the first neural network is a convolutional neural network that accounts for thermal sourcing and sinking, the second neural network is a recurrent neural network that accounts for 3D thermal diffusion, and the third neural network is a convolutional neural network that accounts for contributions from the first neural network and the second neural network.

5. The method of claim 4, wherein the second neural network is a long short term memory (LSTM) recurrent neural network having a convolutional neural network coupled to each network layer of the second neural network.

6. The method of claim 2, wherein the thermal image is a thermal image of the layer at a first time, and wherein computing the predicted heat map comprises computing the predicted heat map of the layer corresponding to a second time after the first time.

7. The method of claim 1, wherein said computing the predicted heat map is independent of thermal sensing after the at least one convolutional neural network is trained.

8. The method of claim 1, further comprising:
   obtaining a thermal image of a build area;
   computing a loss function based on the predicted heat map and the thermal image; and
   training the at least one convolutional neural network based on the loss function.

9. The method of claim 1, wherein the contone map and a thermal image are inputs to the at least one convolutional neural network to compute the predicted heat map.

10. A three-dimensional (3D) printing system, comprising:
    a build area;
    a print head configured to print a fusing agent based on a fusing contone map and to print a detailing agent based on a detailing contone map, wherein the fusing contone map comprises a first set of values indicative of fusing agent placement and the detailing contone map comprises a second set of values indicative of detailing agent placement;
    a thermal projector; and
    a controller, wherein the controller is configured to:
       use at least one convolutional neural network to predict thermal behavior of a layer based on the fusing contone map and the detailing contone map.

11. The 3D printing system of claim 10, wherein the controller is further configured to control the print head based on the predicted thermal behavior.

12. A non-transitory tangible computer-readable medium storing executable code, comprising:
    code for causing a processor to predict, using at least one convolutional neural network, thermal behavior of a layer corresponding to a 3D model based on voxel-level machine instructions, wherein the voxel-level machine instructions and a thermal image are inputs to the at least one convolutional neural network to predict the thermal behavior; and
    code for causing the processor to print the layer or perform offline print tuning based on the predicted heat map.

13. The computer-readable medium of claim 12, further comprising code for causing the processor to train the at least one convolutional neural network based on the predicted thermal behavior and a thermal image of the layer.

* * * * *